(12) United States Patent
Lee

(10) Patent No.: US 12,240,411 B1
(45) Date of Patent: Mar. 4, 2025

(54) SEAT BELT BUCKLE, SEAT BELT FASTENER, AND VEHICLE STEERING WHEEL LOCKING METHOD

(71) Applicant: ABA LOCKS INTERNATIONAL CO., LTD., New Taipei (TW)

(72) Inventor: Miko Lee, New Taipei (TW)

(73) Assignee: ABA LOCKS INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 18/436,996

(22) Filed: Feb. 8, 2024

(51) Int. Cl.
*B60R 22/18* (2006.01)
*B60R 25/022* (2013.01)

(52) U.S. Cl.
CPC .......... *B60R 22/18* (2013.01); *B60R 25/0221* (2013.01); *B60R 2022/1806* (2013.01)

(58) Field of Classification Search
CPC ................ B60R 22/18; B60R 25/0221; B60R 2022/1806; B60R 25/0228; B60R 2325/20
USPC .................... 280/801.1, 806; 701/45; 24/654
See application file for complete search history.

(56) References Cited

U.S. PATENT DOCUMENTS

| | | | |
|---|---|---|---|
| 6,076,239 A * | 6/2000 | Kopetzky | B60R 21/01546 24/641 |
| 6,931,696 B2 | 8/2005 | Lee et al. | |
| 7,866,703 B2 * | 1/2011 | Spahn | B60R 22/03 280/806 |
| 11,751,642 B2 * | 9/2023 | Chiu | B60R 22/48 24/603 |
| 2008/0290644 A1 | 11/2008 | Spahn et al. | |
| 2022/0287417 A1 | 9/2022 | Pan | |
| 2023/0072193 A1 | 3/2023 | Chiu et al. | |

FOREIGN PATENT DOCUMENTS

| | | |
|---|---|---|
| CN | 104661881 A | 5/2015 |
| GB | 2335945 A | 10/1999 |
| JP | 2002362314 A | 12/2002 |
| TW | M519097 U | 3/2016 |

* cited by examiner

*Primary Examiner* — Paul N Dickson
*Assistant Examiner* — Caitlin Anne Miller
(74) *Attorney, Agent, or Firm* — Marshall Lerner; Brad Mattes; Kleinberg & Lerner LLP.

(57) ABSTRACT

A seat belt buckle for a seat belt fastener and a vehicle steering wheel locking method. The seat belt buckle includes a housing, and a buckling assembly and a locking assembly mounted on the housing. The buckling assembly includes a buckling slider, a tripping button, and a stop slider. The locking assembly includes a limiting panel and a lock. When a latch plate is inserted in to a plate hole of the seat belt buckle, the latch plate engages with the buckling slider. When the lock is switched to a locking state, the limiting panel is driven to limit the tripping button to prevent the tripping button from being pressed, and the latch plate and the buckling slider from disengaging from each other.

19 Claims, 15 Drawing Sheets

SEAT BELT BUCKLE, SEAT BELT FASTENER, AND VEHICLE STEERING WHEEL LOCKING METHOD

BACKGROUND OF THE INVENTION

1. Field of the Invention

The present invention relates to a seat belt fastener, especially to a seat belt buckle for locking a latch plate in the seat belt buckle, a seat belt fastener, and a vehicle steering wheel locking method.

2. Description of the Prior Art(s)

A common way to prevent a vehicle from being stolen is to secure a steering wheel of the vehicle with a steering wheel lock. Thus, the steering wheel is unable to be rotated and the thieves is unable to drive away the vehicle.

A conventional steering wheel lock includes a long rod serving as a main structure and a lock mounted on the rod. In order to prevent the rod from being directly cut off by the thieves, the conventional steering wheel lock must have a solid structure and be made of sturdy materials, which would not only lead the conventional steering wheel lock to high production cost, bulky size and heavy weight, but also make the conventional steering wheel lock have problems of inconvenient to use such as being difficult to carry or occupy space.

To overcome the shortcomings, the present invention provides a seat belt buckle, a seat belt fastener, and a vehicle steering wheel locking method to mitigate or obviate the aforementioned problems.

SUMMARY OF THE INVENTION

The main objective of the present invention is to provide a seat belt buckle that includes a housing, a buckling assembly and a locking assembly.

The housing is hollow and has a button hole and a plate hole.

The buckling assembly is mounted on the housing and includes a buckling slider, a tripping button, and a stop slider. The buckling slider is mounted in the housing and is slidable back and forth between a releasing position and a buckling position. The tripping button is mounted in the button hole of the housing and is slidable between a starting position and a pressed position. When the tripping button moves toward the pressed position of the tripping button, the tripping button drives the buckling slider to move toward the releasing position. The stop slider is mounted in the housing and is movable between a starting position and a pressed position. When the stop slider is positioned at the starting position of the stop slider, the stop slider stops the buckling slider at a position between the releasing position and the buckling position. When the stop slider moves toward the pressed position of the stop slider, the stop slider is departed from the buckling slider and the buckling slider is movable to the buckling position.

The locking assembly is mounted on the housing and includes a limiting panel and a lock. The limiting panel is mounted in the housing and is movable between an unlocked position and a locked position. The limiting panel has at least one limiting leg extending toward the tripping button. When the limiting panel is positioned at the locked position, the tripping button is limited to being positioned at the starting position of the tripping button by the at least one limiting leg. The lock is mounted on the housing and has a core shaft having a locking state and an unlocking state. In the locking state, the limiting panel is driven by the core shaft to be positioned at the locked position.

The main objective of the present invention is to provide a seat belt fastener that includes the seat belt buckle as described above and a latch plate. The latch plate has a latching hole formed through one of two end portions of the latch plate, and the end portion, which has the latching hole, of the latch plate is detachably inserted in the seat belt buckle. When the latch plate is inserted into the plate hole of the seat belt buckle, the buckling slider is pushed to move to the buckling position and engage in the latching hole of the latch plate.

The main objective of the present invention is to provide a vehicle steering wheel locking method that includes steps of:
  providing the seat belt buckle as described above, wherein the seat belt buckle is installed on a side of a seat of a vehicle;
  providing a webbing, wherein the webbing is mounted on a vehicle housing of the vehicle beside another side of the seat and is retractable in length;
  providing a latch plate, wherein latch plate has a latching hole formed through one of two end portions of the latch plate and the other end portion of the latch plate is connected with the webbing; and
  holding the latch plate that is connected with the webbing to pass through a steering wheel of the vehicle and inserting the latch plate into the seat belt buckle.

When a user gets off the vehicle, the user can hold the latch plate to pass through the steering wheel of the vehicle to wind the webbing around the steering wheel, then insert the latch plate into the seat belt buckle and switch the lock to the locking state. Accordingly, a rotation angle of the steering wheel is limited, so as to prevent the vehicle from being stolen by someone with bad intensions.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
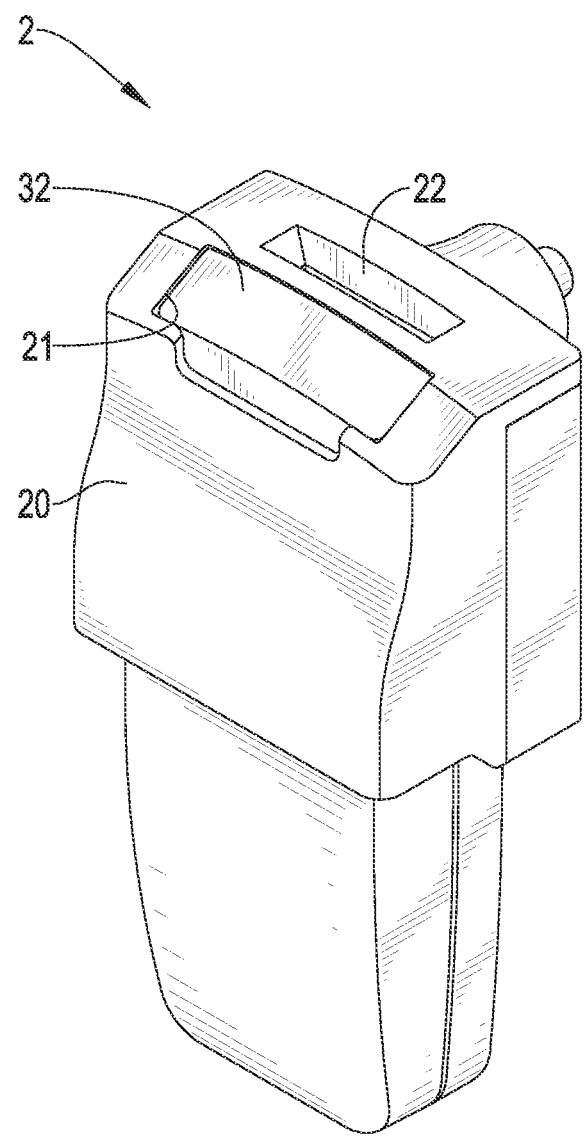
FIG. 1 is a front perspective view of a seat belt buckle in accordance with the present invention.
Figure 2:
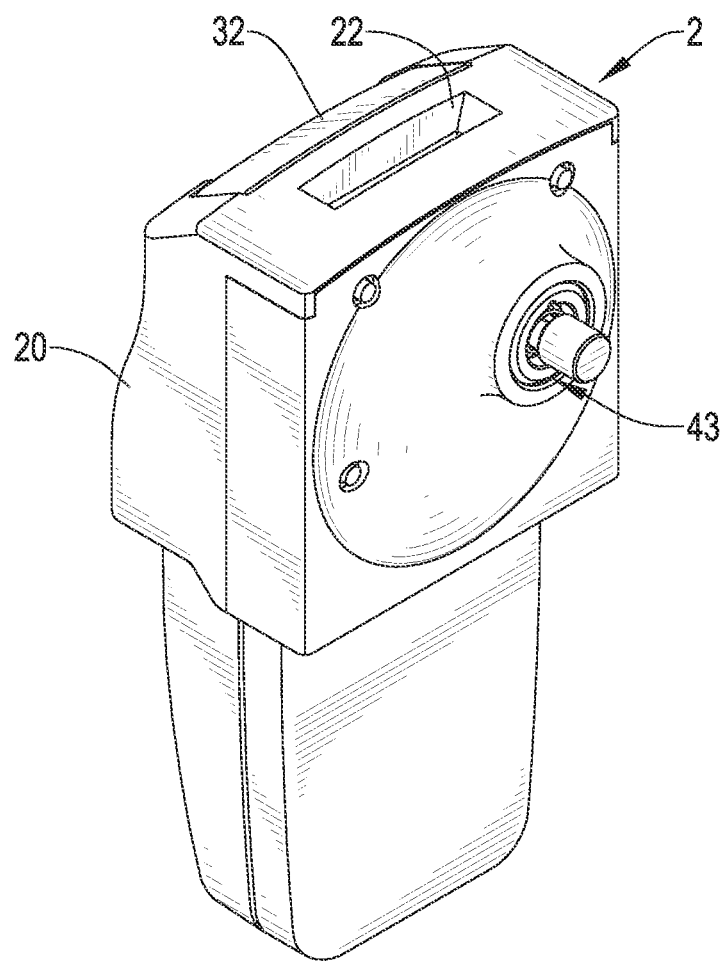
FIG. 2 is a rear perspective view of the seat belt buckle in FIG. 1.
Figure 7:
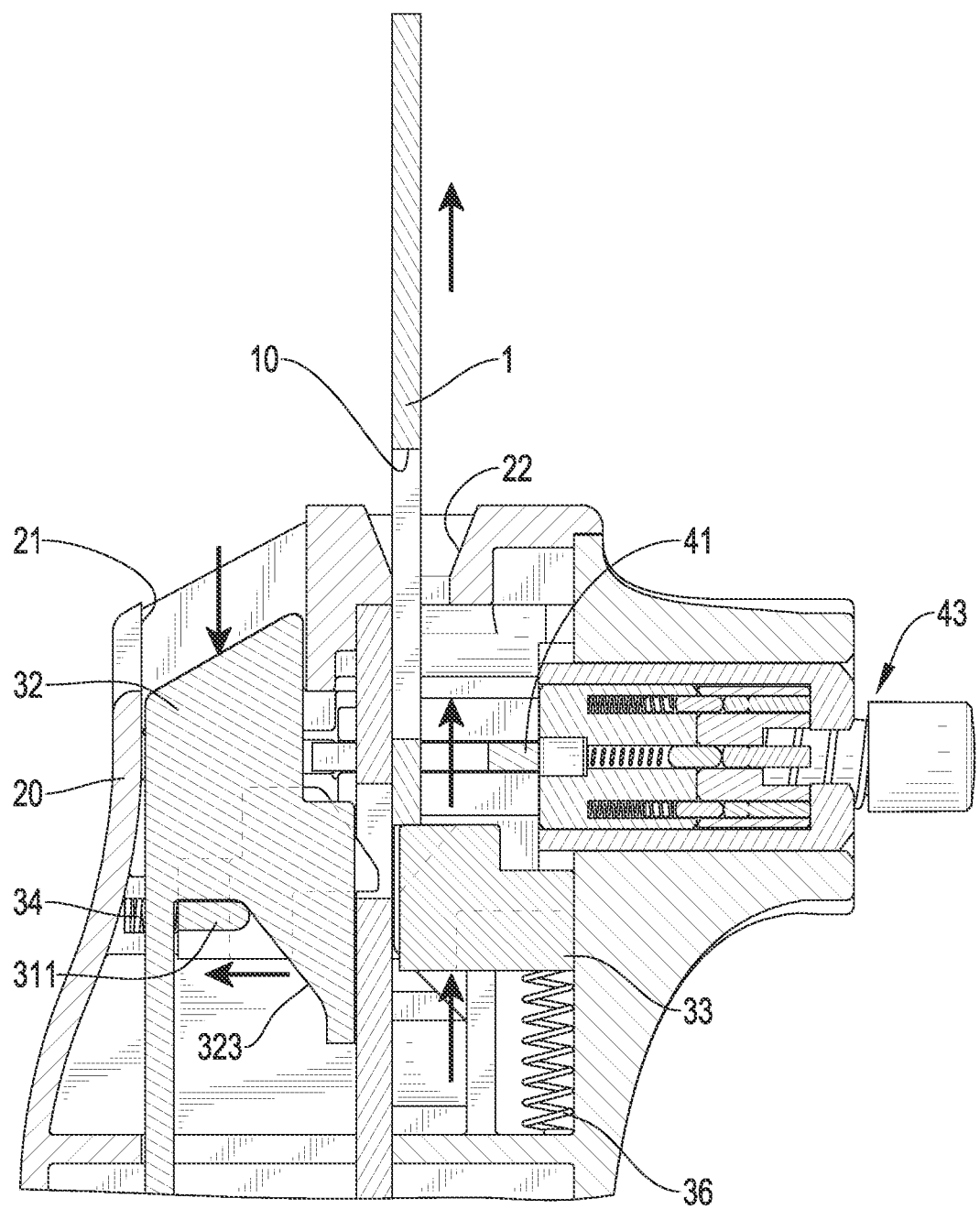
Figure 8:
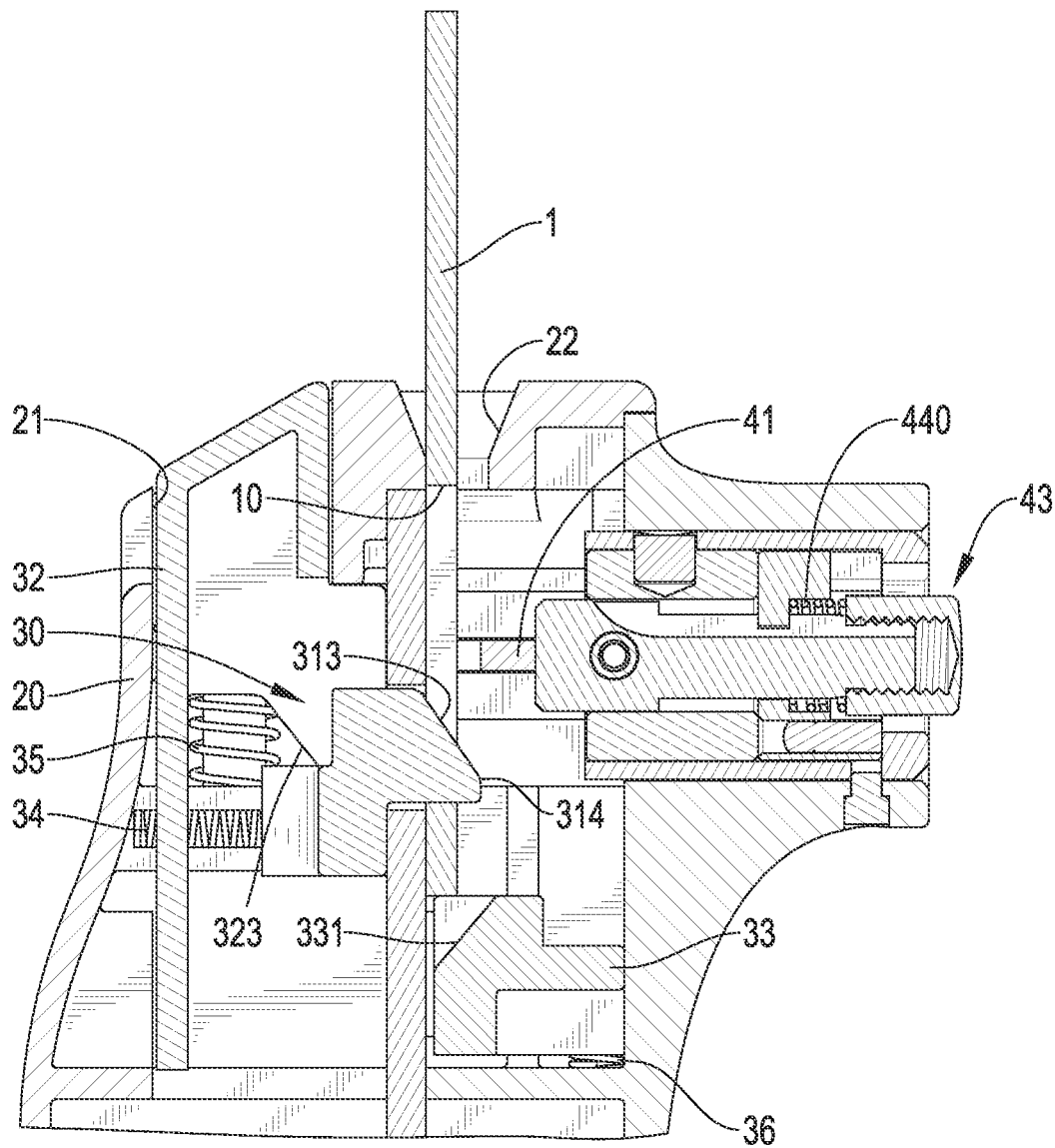
FIG. 8 is a cross-sectional side view of a seat buckle in accordance with the present invention, shown locked.
Figure 14:
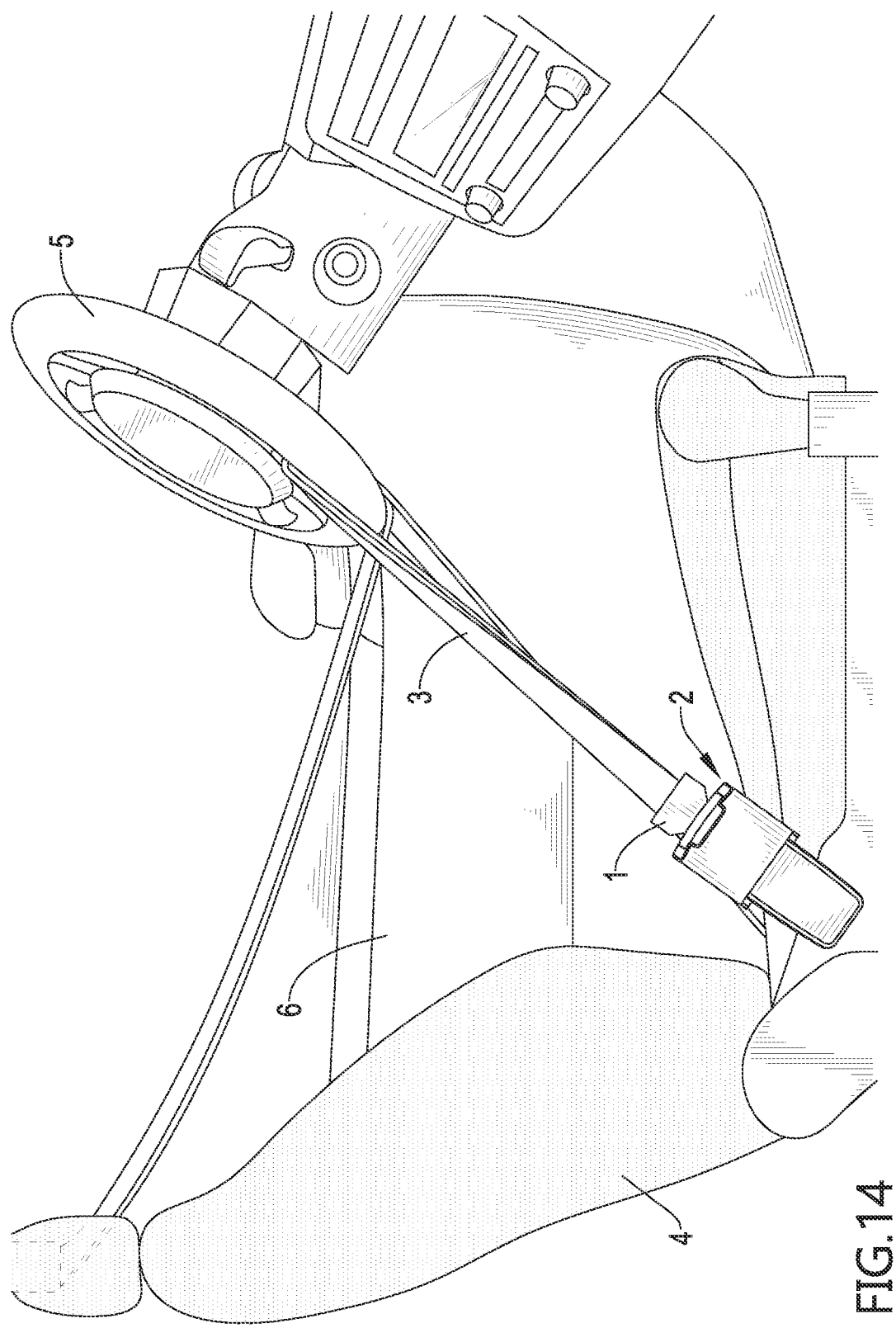
FIG. 14 is a schematic operational view of the seat belt fastener in FIG. 8, showing the seat belt fastener being used for locking a steering wheel of a vehicle.

With reference to FIGS. 1, 2 and 14, a seat belt fastener in accordance with the present invention comprises a latch plate 1 and a seat belt buckle 2. With further reference to FIGS. 7, 8 and 14, the latch plate 1 has two end portions. One of the end portions of the latch plate 1 is connected with a webbing 3 and a latching hole 10 is formed through the other end portion of the latch plate 1. The end portion, which has the latching hole 10, of the latch plate 1 is detachably inserted in the seat belt buckle 2.

Figure 3:
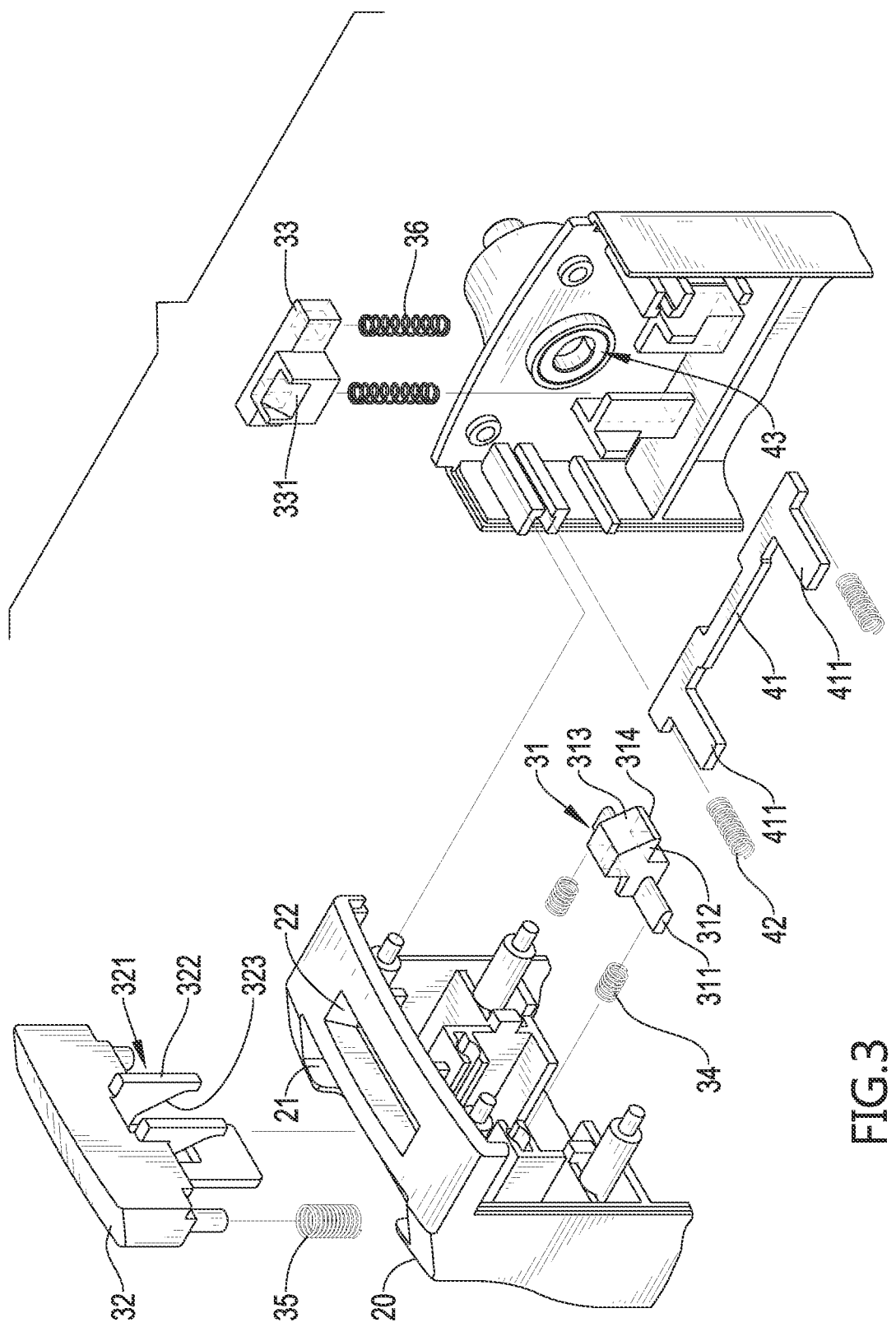
FIG. 3 is an enlarged cross-sectional side view of the seat belt buckle in FIG. 1.
Figure 4:
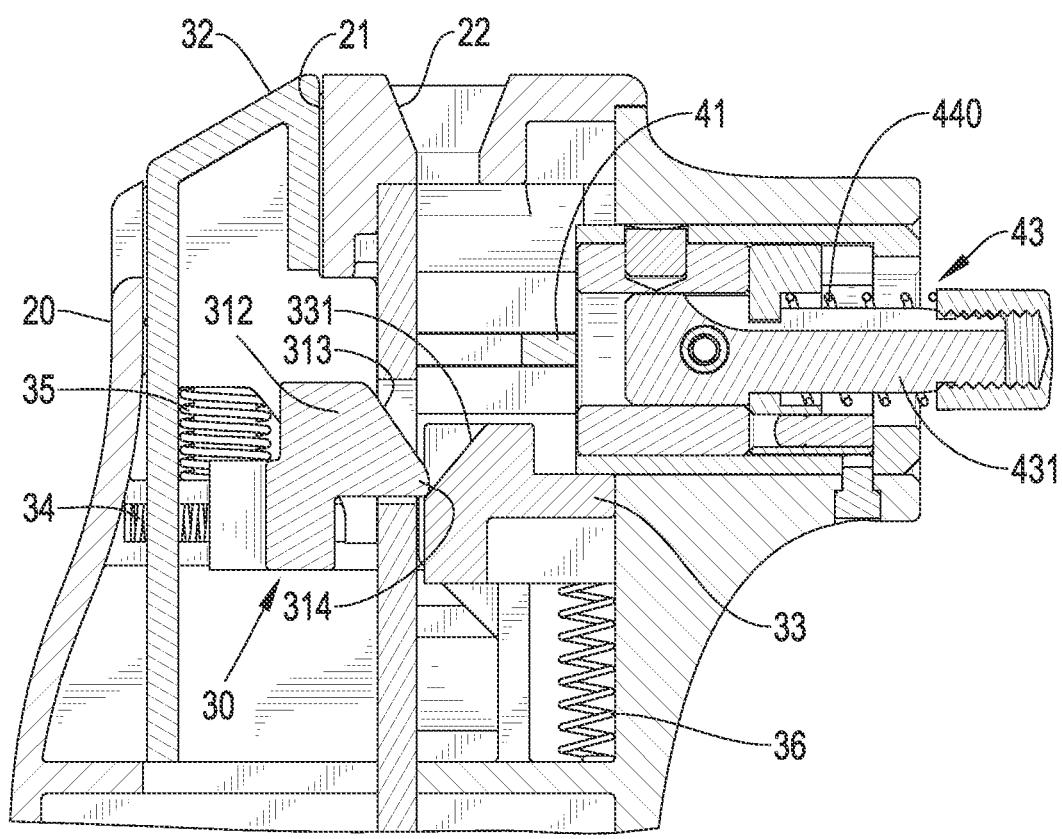
FIG. 4 is an enlarged exploded perspective view of the seat belt buckle in FIG. 1, shown unlocked.
Figure 5:
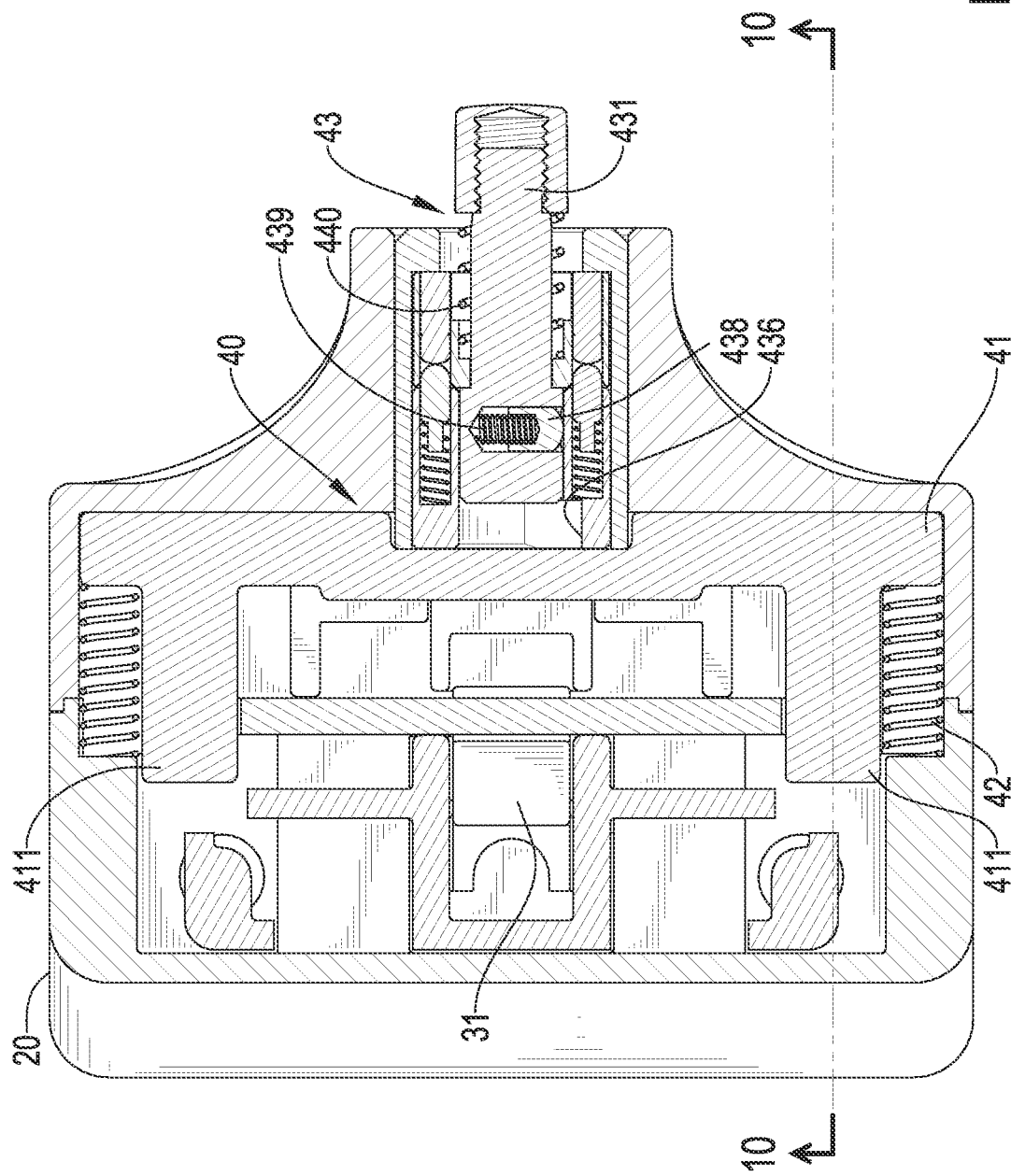
FIG. 5 is a cross-sectional top view of the seat belt buckle in FIG. 1, shown unlocked.

With further reference to FIGS. 3 to 5, the seat belt buckle 2 is installed on a side of a seat 4 of a vehicle, has a locking mechanism, and includes a housing 20, a buckling assembly 30 and a locking assembly 40.

The housing 20 is hollow and has a front sidewall and a rear sidewall oppositely defined on the housing 20. The housing 20 has a button hole 21 and a plate hole 22. The button hole 21 is formed through a top of the housing 20 and is disposed closer to the front sidewall of the housing 20 than the plate hole 22. The plate hole 22 is formed through the top of the housing 20, is disposed next to the button hole 21, and is disposed closer to the rear sidewall of the housing 20 than the button hole 21.

The buckling assembly 30 is mounted on the housing 20 and includes a buckling slider 31, a tripping button 32 and a stop slider 33.

The buckling slider 31 is mounted in the housing 20 and is slidable back and forth between a releasing position and a buckling position. The releasing position is defined below the button hole 21. The buckling position is defined below the plate hole 22. The buckling slider 31 is driven by at least one first resilient element 34 to move toward the buckling position.

The tripping button 32 is mounted in the button hole 21 of the housing 20 and is slidable between a starting position and a pressed position. The tripping button 32 is driven by at least one second resilient element 35 to move toward the starting position of the tripping button 32. The tripping button 32 is pressable to move toward the pressed position of the tripping button 32 and drive the buckling slider 31 to move toward the releasing position.

Figure 6:
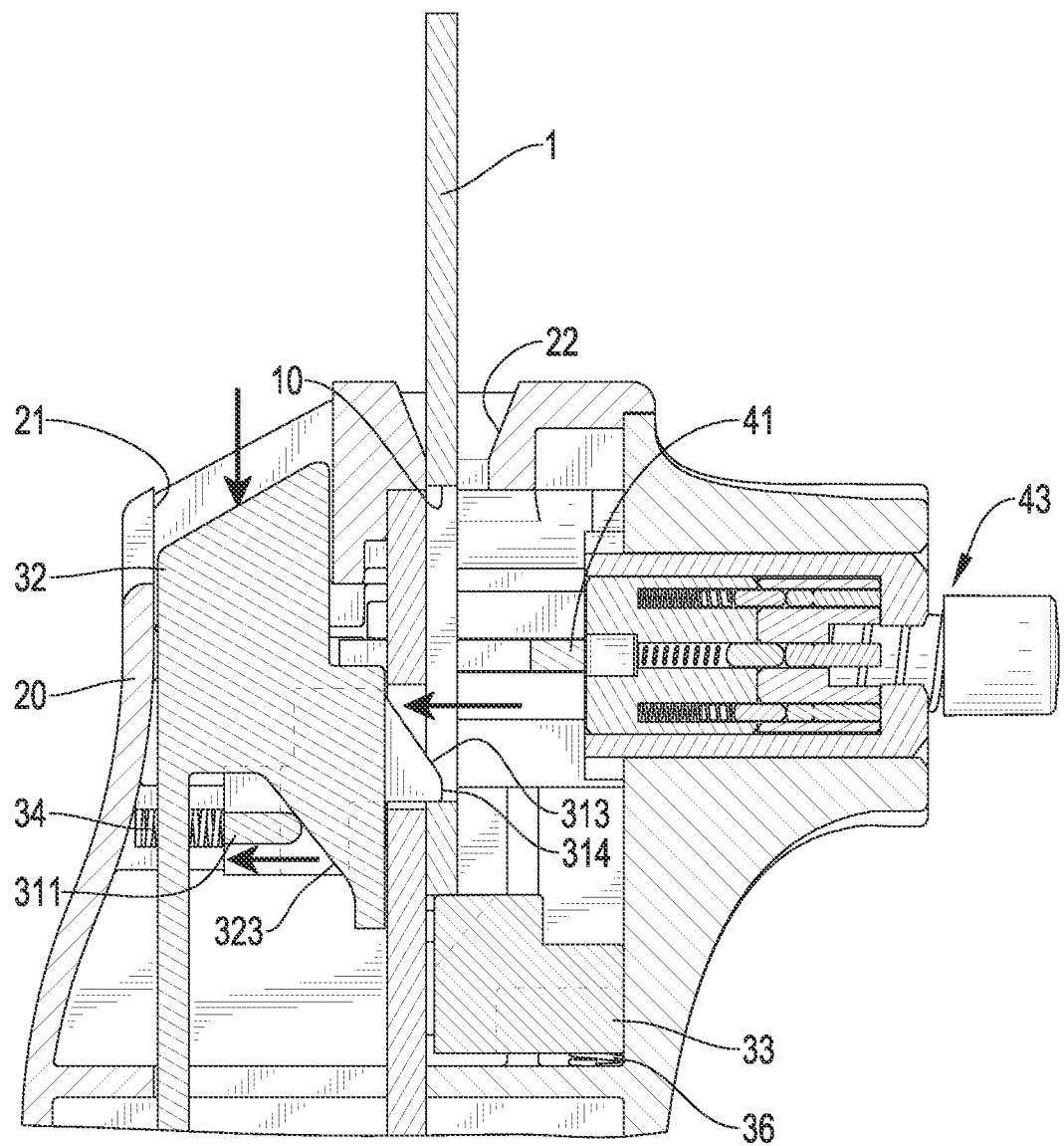
FIGS. 6 and 7 are operational cross-sectional side views of the seat belt buckle in FIG. 1, showing a latch plate being disengaged from the seat belt buckle.

With further reference to FIGS. 3, 6 and 7, specifically, the tripping button 32 is mounted in the button hole 21 of the housing 20 and is movable upward and downward. The tripping button 32 has a driving portion 321. The driving portion 321 has at least one driving panel 322. Each of the at least one driving panel 322 has an inclined guiding edge 323. The inclined guiding edge 323 extends downward and backward toward the rear sidewall of the housing 20. The buckling slider 31 is movable back and forth between the front sidewall and the rear sidewall of the housing 20. The buckling slider 31 has at least one extension rod 311. The at least extension rod 311 corresponds in position to the driving portion 321 of the tripping button 32 and selectively abuts on the inclined guiding edge 323 of the at least one driving panel 322 of the tripping button 32.

Thus, when the tripping button 32 is pressed downward to move toward the pressed position of the tripping button 32, the buckling slider 31 is driven to move toward the front sidewall of the housing 20 by the inclined guiding edge 323 of the at least one driving panel 322. When the tripping button 32 is released, restoring force of the at least one second resilient element pushes the tripping button 32 to move toward the starting position of the tripping button 32 and restoring force of the at least one first resilient element 34 pushes the buckling slider 31 to move toward the buckling position.

As shown in FIG. 3, in the preferred embodiment, the at least one driving panel 322 includes two of the driving panels 322 that are disposed apart from each other, and the at least one extension rod 311 includes two of the extension rods 311. The two extension rods 311 are formed on two opposite sides of the buckling slider 31 and extend laterally toward opposite directions. The buckling slider 31 is disposed between the two driving panels 322 and the two extension rods 311 abut against the two inclined guiding edges 323 of the two driving panels 322 of the tripping button 32 respectively. Thus, when the tripping button 32 is pressed, the two driving panels 322 are driven to abut against the two extension rods 311 and move the buckling slider 31.

With reference to FIGS. 3, 4 and 6, the stop slider 33 is mounted in the housing 20 and is movable between a starting position and a pressed position. The stop slider 33 is driven by at least one third resilient element 36 to move toward the starting position of the stop slider 33 and to stop the buckling slider 31 at a position between the releasing position and the buckling position. When the stop slider 33 is pressed to move toward the pressed position of the stop slider 33, the stop slider 33 is departed from the buckling slider 31 and the buckling slider 31 is pushed by the at least one first resilient element 34 to move to the buckling position.

Specifically, the stop slider 33 is mounted in the housing 20 and is movable upward and downward. The stop slider 33 has an inclined pushing surface 331. The inclined pushing surface 331 extends downward and forward toward the front sidewall of the housing 20. The buckling slider 31 has an engaging protrusion 312 protruding toward the rear sidewall of the housing 20. The engaging protrusion 312 has an inclined guiding surface 313 and a distal end edge 314. The inclined guiding surface 313 extends downward and backward toward the rear sidewall of the housing 20. The distal end edge 314 is positioned toward the rear sidewall of the housing 20.

As shown in FIG. 4, when the stop slider 33 is positioned at the starting position of the stop slider 33, the distal end edge 314 abuts on the inclined pushing surface 331 of the stop slider 33. Thus, the stop slider 33 stops the buckling slider 31 at the position between the releasing position and the buckling position. As shown in FIG. 6, when the stop slider 33 is pressed to move toward the pressed position of the stop slider 33, the distal end edge 314 of the engaging protrusion 312 of the buckling slider 31 moves along the inclined pushing surface 331 of the stop slider 33. As the distal end edge 314 of the engaging protrusion 312 is departed from the stop slider 33, the buckling slider 31 is pushed by the at least one first resilient element 34 to move to the buckling position.

With reference to FIGS. 3, 5, 9 and 10, the locking assembly 40 is mounted on the housing 20 and includes a limiting panel 41 and a lock 43.

The limiting panel 41 is mounted in the housing 20 and is movable between an unlocked position and a locked position. The limiting panel 41 has at least one limiting leg 411 extending toward the tripping button 32. When the limiting panel 41 is positioned at the locked position, the tripping button 32 is limited to being positioned at the starting position of the tripping button 32 by the at least one limiting leg 411.

The lock 43 is mounted on the housing 20 and has a core shaft 431. The core shaft 431 corresponds in position to the limiting panel 41 and selectively drives the limiting panel 41 to move. The lock 43 has a locking state and an unlocking state. In the locking state, the limiting panel 41 is driven by the core shaft 431 to be positioned at the locked position; in the unlocking state, the limiting panel 41 is driven to move to the unlocked position.

By positioning the limiting panel 41 at the locked position to allow the at least one limiting leg 411 to limit the tripping button 32 to be positioned at the starting position of the tripping button 32, the tripping button 32 is unable to be pressed to move to the pressed position of the tripping button 32 and the buckling slider 31 is unable to be moved to the releasing position accordingly. When the limiting panel 41 is moved back to the unlocked position, the tripping button 32 is able to be pressed to the pressed position of the tripping button 32 and the buckling slider 31 is able to be moved to the releasing position accordingly.

Specifically, the limiting panel 41 is driven by at least one fourth resilient element 42 to move toward the unlocked position. When the lock 43 is being switched to the locking state, the core shaft 431 of the lock 43 pushes the limiting panel 41 to move to the locked position such that the tripping button 32 is unable to be pressed. When the lock 43 is switched to the unlocking state, restoring force of the fourth resilient element 42 pushes the limiting panel 41 to move back to the unlocked position, such that the tripping button 32 is able to be pressed to the pressed position of the tripping button 32. However, the way of driving the limiting panel 41 is not limited to the way as described above, and the limiting panel 41 may also be directly driven by the core shaft 431 of the lock 43 to move back and forth between the unlocked position and the locked position.

In the preferred embodiment, the lock 43 may be a plunger lock and the core shaft 431 may stretch out and draw back axially to drive the limiting panel 41 when the lock 43 is being switched to the locking state or the unlocking state. However, it is not limited thereto and the lock 43 may also be a rotary lock or other type of lock, as long as the lock 43 is able to drive the limiting panel 41 to move back and forth between the unlocked position and the locked position.

Figure 11:
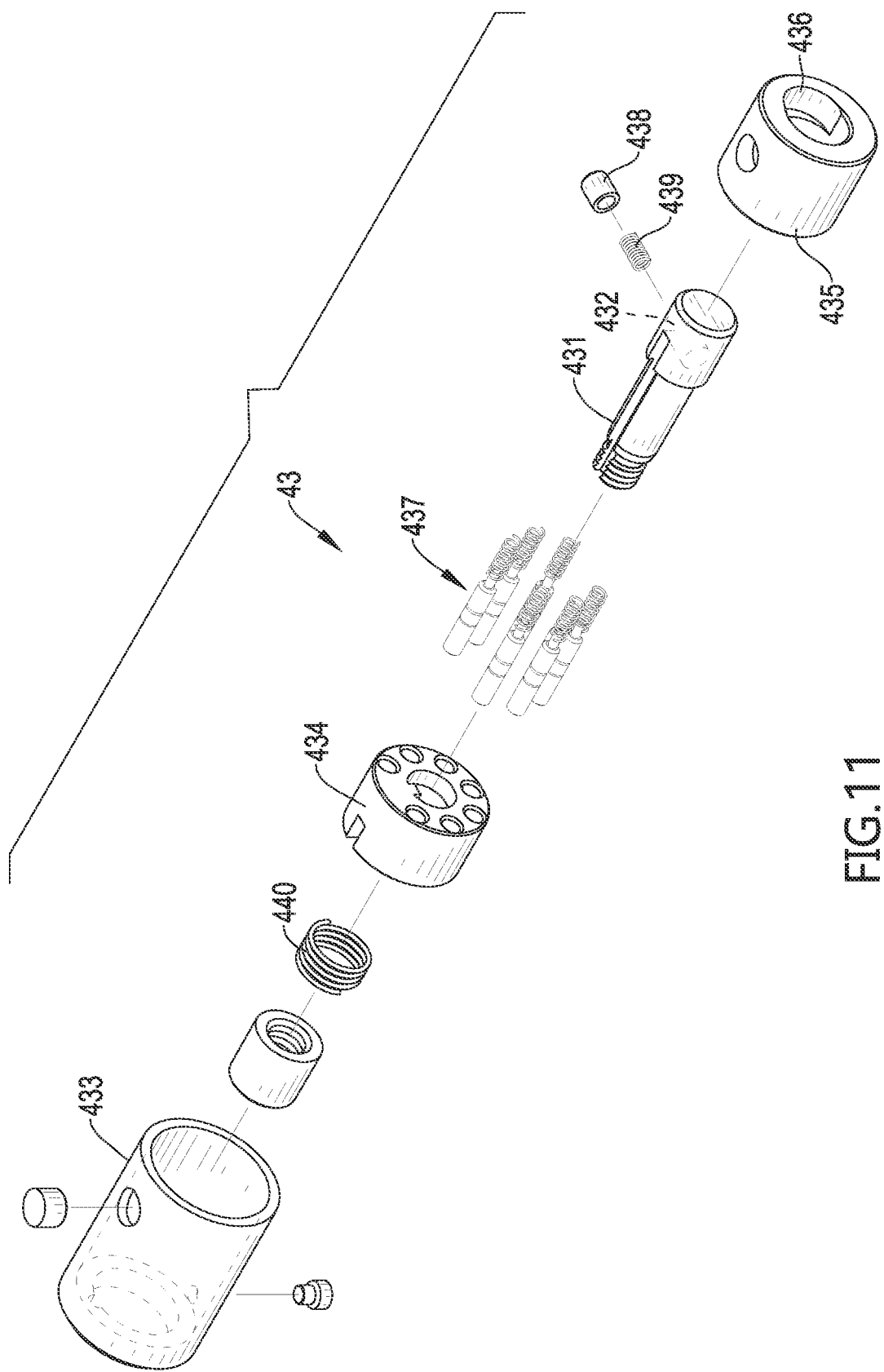
FIG. 11 is an exploded perspective view of a lock of the seat belt buckle in FIG. 1.
Figure 12:
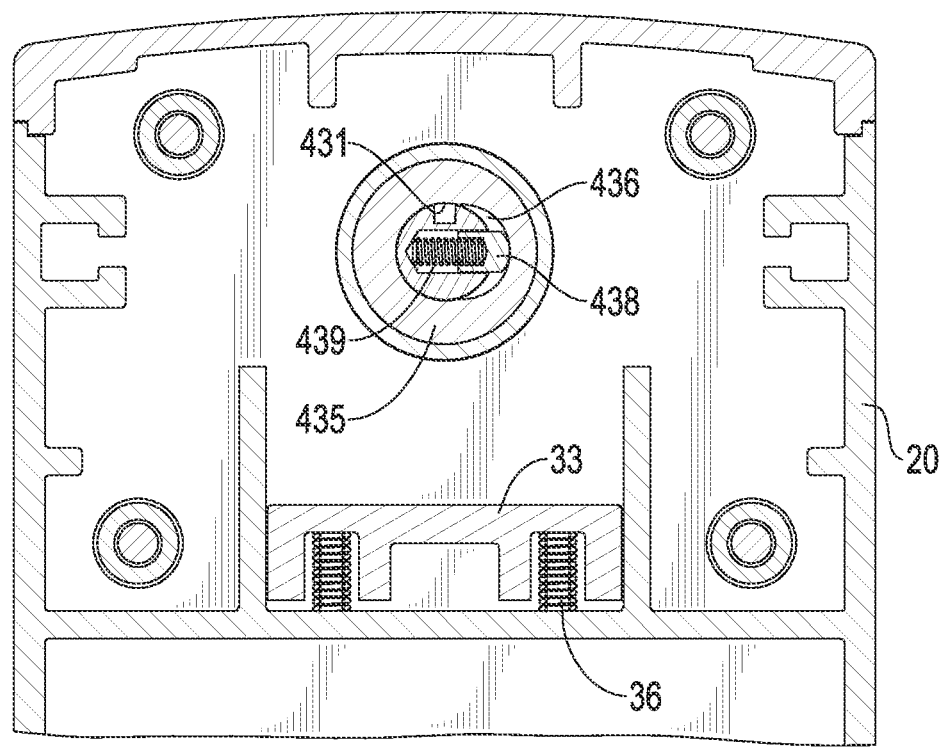
FIG. 12 is a cross-sectional end view of the seat belt buckle in FIG. 1, showing the lock of the seat belt buckle being locked.
Figure 13:
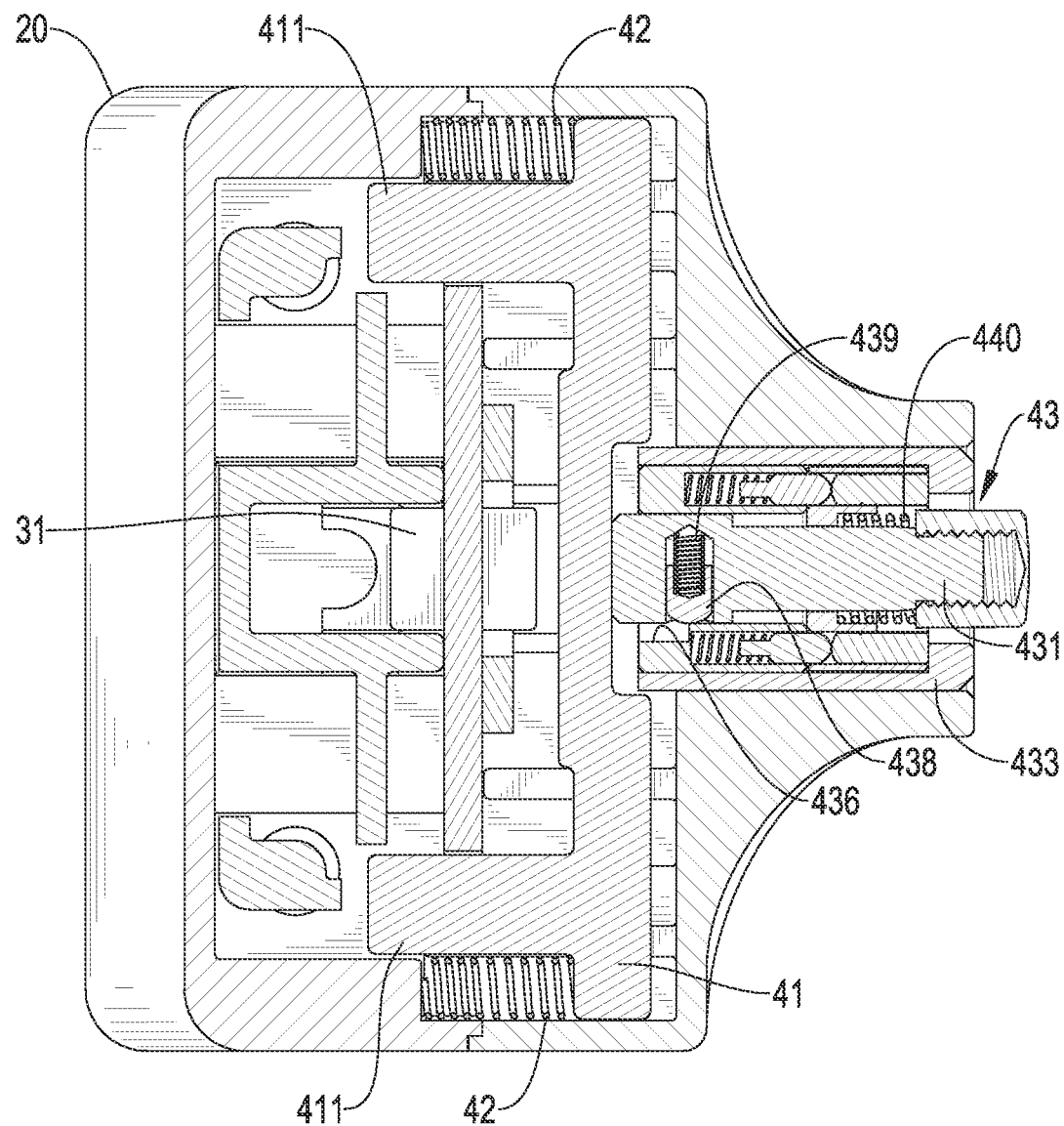
FIG. 13 is a cross-sectional top view of the seat belt fastener in FIG. 8, showing the lock of the seat belt buckle being unlocked.

With reference to FIGS. 11 to 13, to be further specific, the lock 43 may include a lock housing 433, an upper pin seat 431, a lower pin seat 435, multiple pin assemblies 437, and the core shaft 431. The upper pin seat 431 and the lower pin seat 435 are mounted in the lock housing 433. The pin assemblies 437 and the core shaft 431 are mounted in the upper pin seat 431 and the lower pin seat 435. An engaging recess 436 is formed in an inner wall of the lower pin seat 435, and a bottom defined in the engaging recess 436 is formed as a concave arc surface. The core shaft 431 is axially mounted through the upper pin seat 434 and the lower pin seat 435. An axial resilient element 440 pushes the core shaft 431 to protrude out from a front end of the upper pin seat 434. A radial recess 432 is formed in an outer wall of the core shaft 431 and is provided with a positioning pin 438 and a radial resilient element 439. The radial resilient element 439 is mounted between the positioning pin 438 and a bottom defined in the radial recess 432. The positioning pin 438 selectively protrudes into the engaging recess 436 of the lower pin seat 435.

The core shaft 431 is pressable to move axially relative to the lower pin seat 435 and to protrude out from a rear end of the lower pin seat 435. With the positioning pin 438 engaging in the engaging recess 436 of the lower pin seat 435, the core shaft 431 is kept protruding out of the lower pin seat 435. When the core shaft 431 is driven to rotate by a key that is for use with the lock 43, the positioning pin 438 leaves the engaging recess 436 and is pressed into the radial recess 432 of the core shaft 431 while moving. Thus, restoring force of the axial resilient element 440 pushes the core shaft 431 to protrude out from the front end of the upper pin seat 434.

With reference to FIGS. 6 to 8, when the latch plate 1 of the seat belt fastener is inserted into the plate hole 22 of the seat belt buckle 2, the latch plate 1 pushes the stop slider 33 to move downward first, then touches the engaging protrusion 312 of the buckling slider 31, and moves along the inclined guiding surface 313 of the engaging protrusion 312 to push the buckling slider 31 to move toward the releasing position. As the latching hole 10 of the latch plate 1 corresponds in position to the buckling slider 31, the buckling slider 31 is pushed by the first resilient element 34 to move to the buckling position and engage in the latching hole 10 of the latch plate 1.

Figure 9:
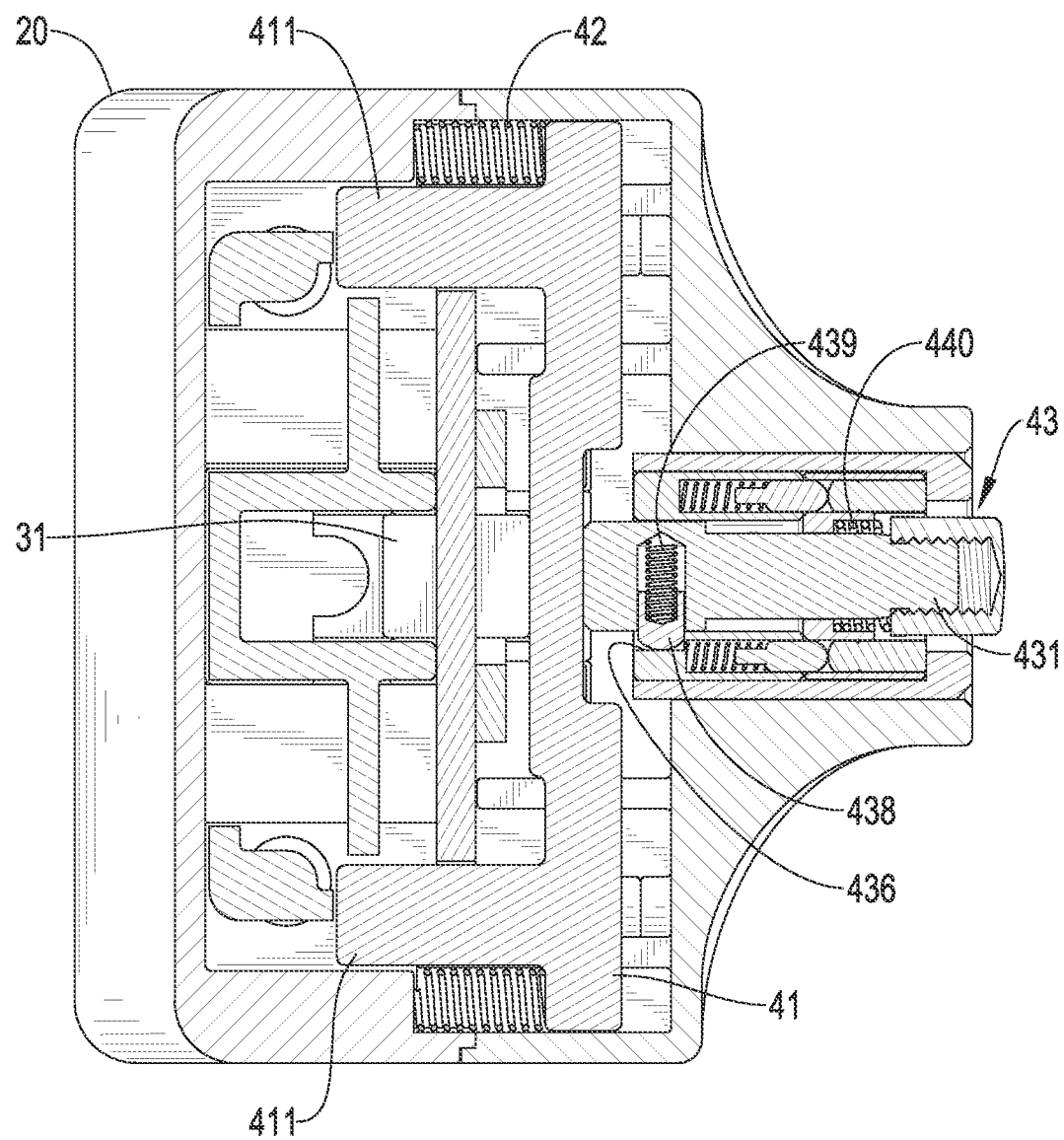
FIG. 9 is a cross-sectional top view of the seat buckle in FIG. 8, shown locked.
Figure 10:
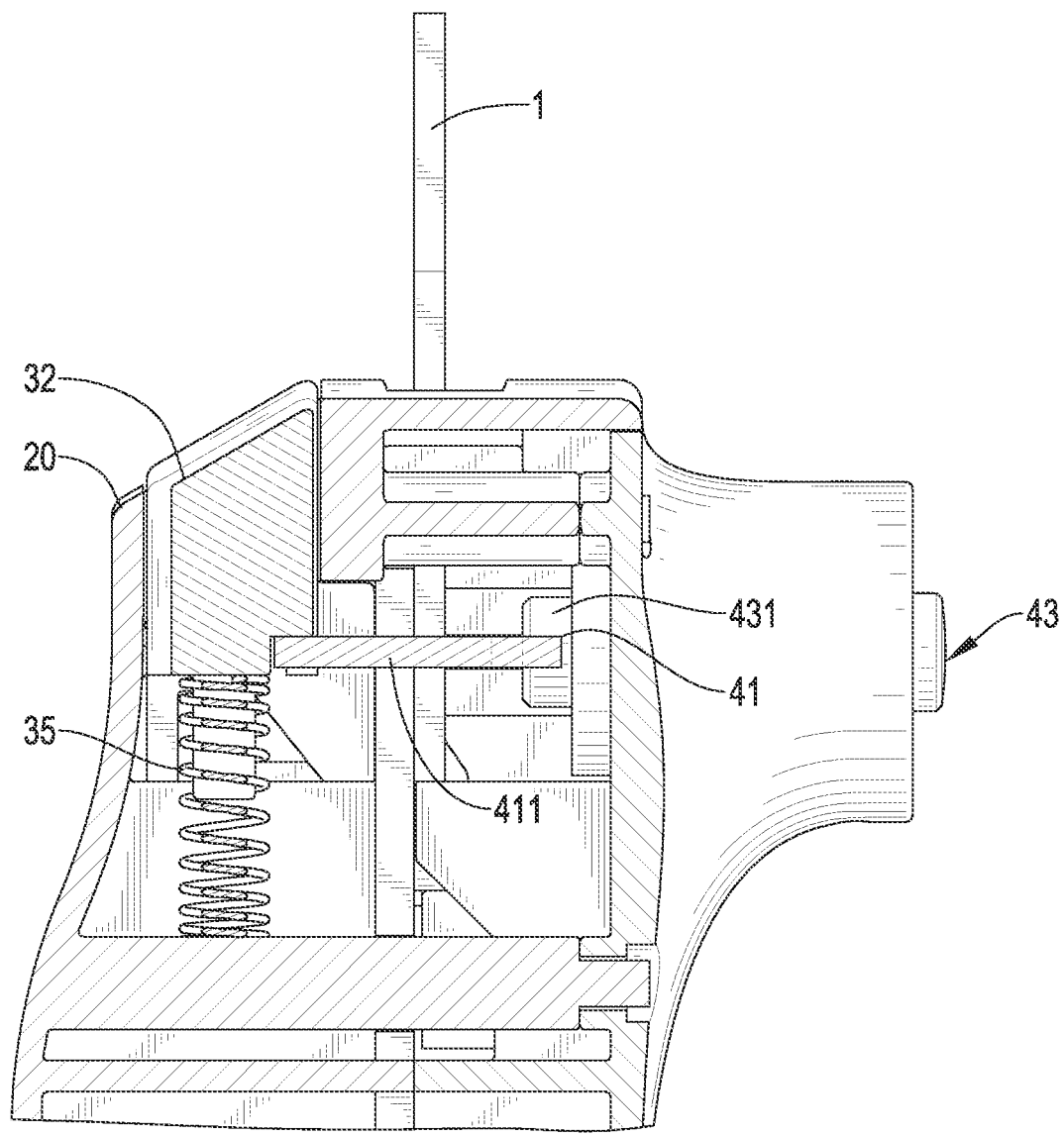
FIG. 10 is a cross-sectional side view cutting along line 10-10 in FIG. 5 of the seat belt buckle in FIG. 1, shown locked

With further reference to FIGS. 8 to 10, then when a user switches the lock 43 to the locking state, the core shaft 431 is driven to push the limiting panel 41 to move to the locked position. Thus, the at least one limiting leg 411 of the limiting panel 41 limits the tripping button 32 to be positioned at the starting position of the tripping button 32 and the tripping button 32 is unable to be pressed, so that the latch plate 1 is locked in the seat belt buckle 2.

Figure 15:
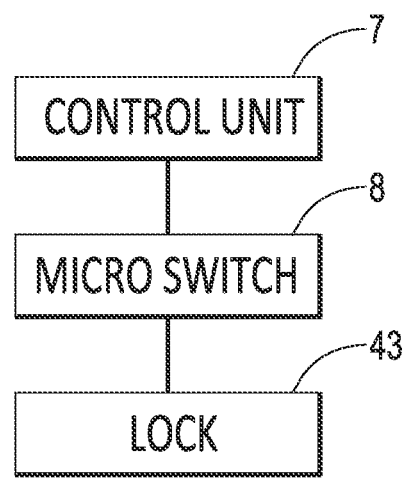
FIG. 15 is an operational block diagram, showing the lock of the seat belt buckle being electrically connected to a control unit of the vehicle.

With reference to FIGS. 14 and 15, the seat belt buckle 2 may be used to lock a steering wheel 5 of the vehicle. The seat belt buckle 2 is installed on the side of the seat 4 of the vehicle, and the webbing 3 is mounted on a vehicle housing 6 of the vehicle beside another side of the seat 4 and is retractable in length. When the user gets off the vehicle, the user holds the latch plate 1 that is connected with the webbing 3 to pass through the steering wheel 5 of the vehicle to wind the webbing 3 around the steering wheel 5, then inserts the latch plate 1 into the seat belt buckle 2 and switches the lock 43 to the locking state. Accordingly, a rotation angle of the steering wheel 5 is limited, so as to prevent the vehicle from being stolen by someone with bad intensions.

Furthermore, a micro switch 8 may be mounted in the seat belt buckle 2. The micro switch 8 is electrically connected with a control unit 7 of the vehicle. When the lock 43 is in the locking state, the micro switch 8 is triggered to send a signal to the control unit 7 to switch the vehicle to a power-off state. Thus, the user is unable to start the vehicle by inserting a vehicle key into a keyhole of the vehicle. When the lock 43 is switched from the locking state to the unlocking state, the micro switch 8 stops sending the signal to the control unit 7 and the vehicle is returned to a ready-to-start state. Thus, the user is able to insert the vehicle key into the keyhole of the vehicle to start the vehicle. With the above-described configuration, the vehicle is able to be further prevented from being stolen.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A seat belt buckle including:
   a housing being hollow and having a button hole and a plate hole;
   a buckling assembly mounted on the housing and including
   a buckling slider mounted in the housing and being slidable back and forth between a releasing position and a buckling position;
   a tripping button mounted in the button hole of the housing and being slidable between a starting position and a pressed position, wherein when the tripping button moves toward the pressed position of the tripping button, the tripping button drives the buckling slider to move toward the releasing position; and
   a stop slider mounted in the housing and being movable between a starting position and a pressed position, wherein
   when the stop slider is positioned at the starting position of the stop slider, the stop slider stops the buckling slider at a position between the releasing position and the buckling position; and
   when the stop slider moves toward the pressed position of the stop slider, the stop slider is departed from the buckling slider and the buckling slider is movable to the buckling position; and
   a locking assembly mounted on the housing and including
   a limiting panel mounted in the housing and being movable between an unlocked position and a locked position, and the limiting panel having at least one limiting leg extending toward the tripping button, wherein when the limiting panel is positioned at the locked position, the tripping button is limited to being positioned at the starting position of the tripping button by the at least one limiting leg; and
   a lock mounted on the housing and having a core shaft, and the lock having a locking state and an unlocking state, wherein in the locking state, the limiting panel is driven by the core shaft to be positioned at the locked position.

2. The seat belt buckle as claimed in claim 1, wherein
   the buckling slider is driven by at least one first resilient element to move toward the buckling position;
   the tripping button is driven by at least one second resilient element to move toward the starting position of the tripping button and is pressable to move toward the pressed position of the tripping button; and
   the stop slider is driven by at least one third resilient element to move toward the starting position of the stop slider, and is pressable to move toward the pressed position of the stop slider.

3. The seat belt buckle as claimed in claim 1, wherein
   the limiting panel is driven by at least one fourth resilient element to move toward the unlocked position; and
   when the lock is in the locking state, the limiting panel is pushed by the core shaft to be positioned at the locked position.

4. The seat belt buckle as claimed in claim 2, wherein
   the limiting panel is driven by at least one fourth resilient element to move toward the unlocked position; and
   when the lock is in the locking state, the limiting panel is pushed by the core shaft to be positioned at the locked position.

5. The seat belt buckle as claimed in claim 1, wherein the lock is a plunger lock and the core shaft stretches out and draws back axially to drive the limiting panel when the lock is being switched to the locking state or the unlocking state.

6. The seat belt buckle as claimed in claim 1, wherein
   the tripping button is mounted in the button hole of the housing, is movable upward and downward, and has a driving portion; the driving portion has at least one driving panel, and each of the at least one driving panel has an inclined guiding edge; and the inclined guiding edge extends downward and backward toward a rear sidewall of the housing; and
   the buckling slider is movable back and forth in the housing and has at least one extension rod; the at least extension rod corresponds in position to the driving portion of the tripping button and selectively abuts on the inclined guiding edge of the at least one driving panel of the tripping button.

7. The seat belt buckle as claimed in claim 2, wherein
   the tripping button is mounted in the button hole of the housing, is movable upward and downward, and has a driving portion; the driving portion has at least one driving panel, and each of the at least one driving panel has an inclined guiding edge; and the inclined guiding edge extends downward and backward toward a rear sidewall of the housing; and
   the buckling slider is movable back and forth in the housing and has at least one extension rod; the at least extension rod corresponds in position to the driving portion of the tripping button and selectively abuts on the inclined guiding edge of the at least one driving panel of the tripping button.

8. The seat belt buckle as claimed in claim 3, wherein
   the tripping button is mounted in the button hole of the housing, is movable upward and downward, and has a driving portion; the driving portion has at least one driving panel, and each of the at least one driving panel has an inclined guiding edge; and the inclined guiding edge extends downward and backward toward a rear sidewall of the housing; and
   the buckling slider is movable back and forth in the housing and has at least one extension rod; the at least extension rod corresponds in position to the driving portion of the tripping button and selectively abuts on the inclined guiding edge of the at least one driving panel of the tripping button.

9. The seat belt buckle as claimed in claim 4, wherein
   the tripping button is mounted in the button hole of the housing, is movable upward and downward, and has a driving portion; the driving portion has at least one driving panel, and each of the at least one driving panel has an inclined guiding edge; and the inclined guiding edge extends downward and backward toward a rear sidewall of the housing; and
   the buckling slider is movable back and forth in the housing and has at least one extension rod; the at least extension rod corresponds in position to the driving portion of the tripping button and selectively abuts on the inclined guiding edge of the at least one driving panel of the tripping button.

10. The seat belt buckle as claimed in claim 6, wherein
the at least one driving panel includes two of the driving panels that are disposed apart from each other;
the at least one extension rod includes two of the extension rods, and the two extension rods are formed on two opposite sides of the buckling slider and extend laterally toward opposite directions; and
the buckling slider is disposed between the two driving panels and the two extension rods abut against the two inclined guiding edges of the two driving panels of the tripping button respectively.

11. The seat belt buckle as claimed in claim 1, wherein
the stop slider is mounted in the housing, is movable upward and downward, and has an inclined pushing surface extending downward and forward toward a front sidewall of the housing; and
the buckling slider has an engaging protrusion protruding toward a rear sidewall of the housing and having
an inclined guiding surface extending downward and backward toward the rear sidewall of the housing; and
a distal end edge positioned toward the rear sidewall of the housing.

12. The seat belt buckle as claimed in claim 2, wherein
the stop slider is mounted in the housing, is movable upward and downward, and has an inclined pushing surface extending downward and forward toward a front sidewall of the housing; and
the buckling slider has an engaging protrusion protruding toward a rear sidewall of the housing and having
an inclined guiding surface extending downward and backward toward the rear sidewall of the housing; and
a distal end edge positioned toward the rear sidewall of the housing.

13. The seat belt buckle as claimed in claim 3, wherein
the stop slider is mounted in the housing, is movable upward and downward, and has an inclined pushing surface extending downward and forward toward a front sidewall of the housing; and
the buckling slider has an engaging protrusion protruding toward a rear sidewall of the housing and having
an inclined guiding surface extending downward and backward toward the rear sidewall of the housing; and
a distal end edge positioned toward the rear sidewall of the housing.

14. The seat belt buckle as claimed in claim 4, wherein
the stop slider is mounted in the housing, is movable upward and downward, and has an inclined pushing surface extending downward and forward toward a front sidewall of the housing; and
the buckling slider has an engaging protrusion protruding toward a rear sidewall of the housing and having
an inclined guiding surface extending downward and backward toward the rear sidewall of the housing; and
a distal end edge positioned toward the rear sidewall of the housing.

15. The seat belt buckle as claimed in claim 6, wherein
the stop slider is mounted in the housing, is movable upward and downward, and has an inclined pushing surface extending downward and forward toward a front sidewall of the housing; and
the buckling slider has an engaging protrusion protruding toward the rear sidewall of the housing and having
an inclined guiding surface extending downward and backward toward the rear sidewall of the housing; and
a distal end edge positioned toward the rear sidewall of the housing.

16. A seat belt fastener comprising:
the seat belt buckle as claimed in claim 1; and
a latch plate having a latching hole formed through one of two end portions of the latch plate, and the end portion, which has the latching hole, of the latch plate detachably inserted in the seat belt buckle;
when the latch plate is inserted into the plate hole of the seat belt buckle, the buckling slider is pushed to move to the buckling position and engage in the latching hole of the latch plate.

17. The seat belt fastener as claimed in claim 16, wherein the other end portion of the latch plate is connected with a webbing.

18. A vehicle steering wheel locking method including steps of:
providing the seat belt buckle as claimed in claim 1, wherein the seat belt buckle is installed on a side of a seat of a vehicle;
providing a webbing, wherein the webbing is mounted on a vehicle housing of the vehicle beside another side of the seat and is retractable in length;
providing a latch plate, wherein latch plate has a latching hole formed through one of two end portions of the latch plate and the other end portion of the latch plate is connected with the webbing; and
holding the latch plate that is connected with the webbing to pass through a steering wheel of the vehicle and inserting the latch plate into the seat belt buckle.

19. The vehicle steering wheel locking method as claimed in claim 18, wherein a micro switch is mounted in the seat belt buckle and is electrically connected with a control unit of the vehicle;
when the lock is in the locking state, the micro switch is triggered to send a signal to the control unit to switch the vehicle to a power-off state such that the vehicle is unable to be started; and
when the lock is switched to the unlocking state, the micro switch stops sending the signal to the control unit and the vehicle is returned to a ready-to-start state such that the vehicle is able to be started.

\* \* \* \* \*